US005771686A

United States Patent [19]
Pischinger et al.

[11] Patent Number: 5,771,686
[45] Date of Patent: Jun. 30, 1998

[54] METHOD AND APPARATUS FOR OPERATING A DIESEL ENGINE

[75] Inventors: Stefan Pischinger, Waiblingen; Christof Schön, Remshalden; Michel Weibel, Stuttgart; Bernd Krutzsch, Denkendorf; Rüdiger Pfaff, Stuttgart; Walter Boegner, Remseck, all of Germany

[73] Assignee: Mercedes-Benz AG, Stuttgart, Germany

[21] Appl. No.: 752,386

[22] Filed: Nov. 20, 1996

[30] Foreign Application Priority Data

Nov. 20, 1995 [DE] Germany .................. 195 43 219.3

[51] Int. Cl.[6] .................. F02D 41/14; F01N 3/18; F01N 3/20
[52] U.S. Cl. .................. 60/274; 60/276; 60/285; 60/286; 60/297; 60/301
[58] Field of Search .................. 60/274, 276, 285, 60/286, 297, 301, 311

[56] References Cited

U.S. PATENT DOCUMENTS

| | | | |
|---|---|---|---|
| 5,404,719 | 4/1995 | Araki | 60/276 |
| 5,457,958 | 10/1995 | Boegner | 60/279 |
| 5,473,887 | 12/1995 | Takeshima | 60/276 |
| 5,483,795 | 1/1996 | Katoh et al. | 60/276 |
| 5,609,022 | 3/1997 | Cho | 60/274 |

FOREIGN PATENT DOCUMENTS

| | | |
|---|---|---|
| 0 581 279 | 2/1994 | European Pat. Off. . |
| 0 598 917 | 6/1994 | European Pat. Off. . |

*Primary Examiner*—Tony M. Argenbright
*Attorney, Agent, or Firm*—Evenson, McKeown, Edwards & Lenahan, P.L.L.C.

[57] ABSTRACT

A method and an apparatus are provided for operating a diesel engine with an exhaust feedback device located between the exhaust line and the intake air line, with an adjusting element that can be operated by an adjusting drive actuated by an auxiliary force to operate the exhaust feedback device as a function of signals from an electronic control device. An engine regulator permits rich/lean regulation of the diesel engine as a function of its operating parameters. A storage catalyst is located in the exhaust line, in which catalyst oxides of nitrogen ($NO_x$) can be adsorbed, desorbed, and reduced. A sensor is located downstream from the storage catalyst for detecting the $NO_x$ concentration in the exhaust stream in such fashion that when an $NO_x$ storage threshold value is reached that varies in terms of its characteristics as a function of the rpm and the load, a switch is made from operation with a lambda value of larger than 1 to operation with a lambda value of less than 1.

21 Claims, 2 Drawing Sheets

METHOD AND APPARATUS FOR OPERATING A DIESEL ENGINE

BACKGROUND AND SUMMARY OF THE INVENTION

The invention relates to a method and an apparatus for operating a diesel engine.

A method for operating an internal combustion engine is known from Araki et al, U.S. Pat. No. 5,404,719, with an adsorption device for oxides of nitrogen ($NO_x$) being located in an exhaust scrubbing system, said device adsorbing $NO_x$ when the air-fuel ratio (lambda) of the exhaust flowing into the adsorption device is lean (lambda greater than 1) and releases adsorbed $NO_x$ when the air-fuel ratio (lambda) of the exhaust flowing into the adsorption device is rich (lambda less than 1). The temperature of the $NO_x$ adsorption device is kept within a fixed range by injecting fuel into the exhaust when the temperature of the $NO_x$ storage device drops and by blowing air into the exhaust when the temperature of the $NO_x$ adsorption device becomes too high.

Boegner et al, U.S. Pat. No. 5,457,958, and Takeshima et al, U.S. Pat. No. 5,473,887) are referred to as general technical background.

A goal of the invention is to provide a method and an apparatus in which the $NO_x$ storage and regeneration process is improved over the prior art constituting the species, in such fashion that the emission of oxides of nitrogen, especially in diesel engines, can be reduced further.

This and other goals have been achieved according to the present invention by providing a method for operating a diesel engine including an intake air line and an exhaust line carrying exhaust, an exhaust feedback device communicating the exhaust line with the intake air line, the exhaust feedback device being adjustable as a function of signals from an electronic control device, an engine regulating device controlling an air-fuel ratio of the diesel engine as a function of operating parameters of the diesel engine, a storage catalyst being provided in the exhaust line, the catalyst being capable of adsorbing, desorbing, and reducing $NO_x$, a sensor being provided in the exhaust line downstream from the storage catalyst for detecting the $NO_x$ concentration in the exhaust, the method comprising the step of switching operation of the diesel engine from an operation with the air-fuel ratio greater than one to an operation with the air-fuel ratio less than one when the sensor senses a predetermined $NO_x$ threshold value, which value varies in terms of a characteristic map of the diesel engine as a function of rpm and load.

This and other goals have also been achieved according to the present invention by providing an apparatus for operating a diesel engine comprising an intake air line and an exhaust line carrying exhaust; an exhaust feedback device communicating the exhaust line with the intake air line, the exhaust feedback device being adjustable as a function of signals from an electronic control device; an engine regulating device controlling an air-fuel ratio of the diesel engine as a function of operating parameters of the diesel engine; a storage catalyst arranged in the exhaust line, the catalyst being capable of adsorbing, desorbing, and reducing $NO_x$; and a sensor arranged in the exhaust line downstream from the storage catalyst for detecting the $NO_x$ concentration in the exhaust, the sensor switching operation of the diesel engine from an operation with the air-fuel ratio greater than one to an operation with the air-fuel ratio less than one when the sensor senses a predetermined $NO_x$ threshold value, which value varies in terms of a characteristic map of the diesel engine as a function of rpm and load, the storage catalyst being regenerated when the air-fuel ratio is less than one.

One advantage of the method and apparatus according to the invention consists in the fact that it can be used in particular for reducing oxides of nitrogen ($NO_x$) from diesel engines downstream from the engine, with regeneration of the $NO_x$ storage catalyst not being accomplished by a simple lambda jump but with other measures adapted to the diesel engine being required. Such measures include, for example, exhaust feedback optimized for the exhaust aftertreatment system, suitable intake air throttling, and additional injection of fuel by late injection into the engine or by post-injection into the exhaust pipe. The goal of these measures is firstly to provide sufficient reducing agent in the form of hydrocarbons (HC) for $NO_x$ reduction and secondly to generate a reducing atmosphere in a short period of time in the exhaust to support the regeneration process. $NO_x$ can be adsorbed using the storage catalyst according to the present invention at temperatures as low as approximately 120° C. and thus at relatively lower exhaust temperatures. At temperatures above approximately 200° C., more than 60% of the $NO_x$ contained in the exhaust is reduced together with HC oxidation. In addition, the oxides of nitrogen that were previously adsorbed at low temperatures are reduced for the most part, so that the $NO_x$ storage catalyst is regenerated. During reduction of the oxides of nitrogen, both the oxides of nitrogen that are produced continuously and those that are adsorbed at low exhaust temperatures in the adsorber are reduced by the hydrocarbons.

Other objects, advantages and novel features of the present invention will become apparent from the following detailed description of the invention when considered in conjunction with the accompanying drawings.

DETAILED DESCRIPTION OF THE DRAWINGS

Figure 1:
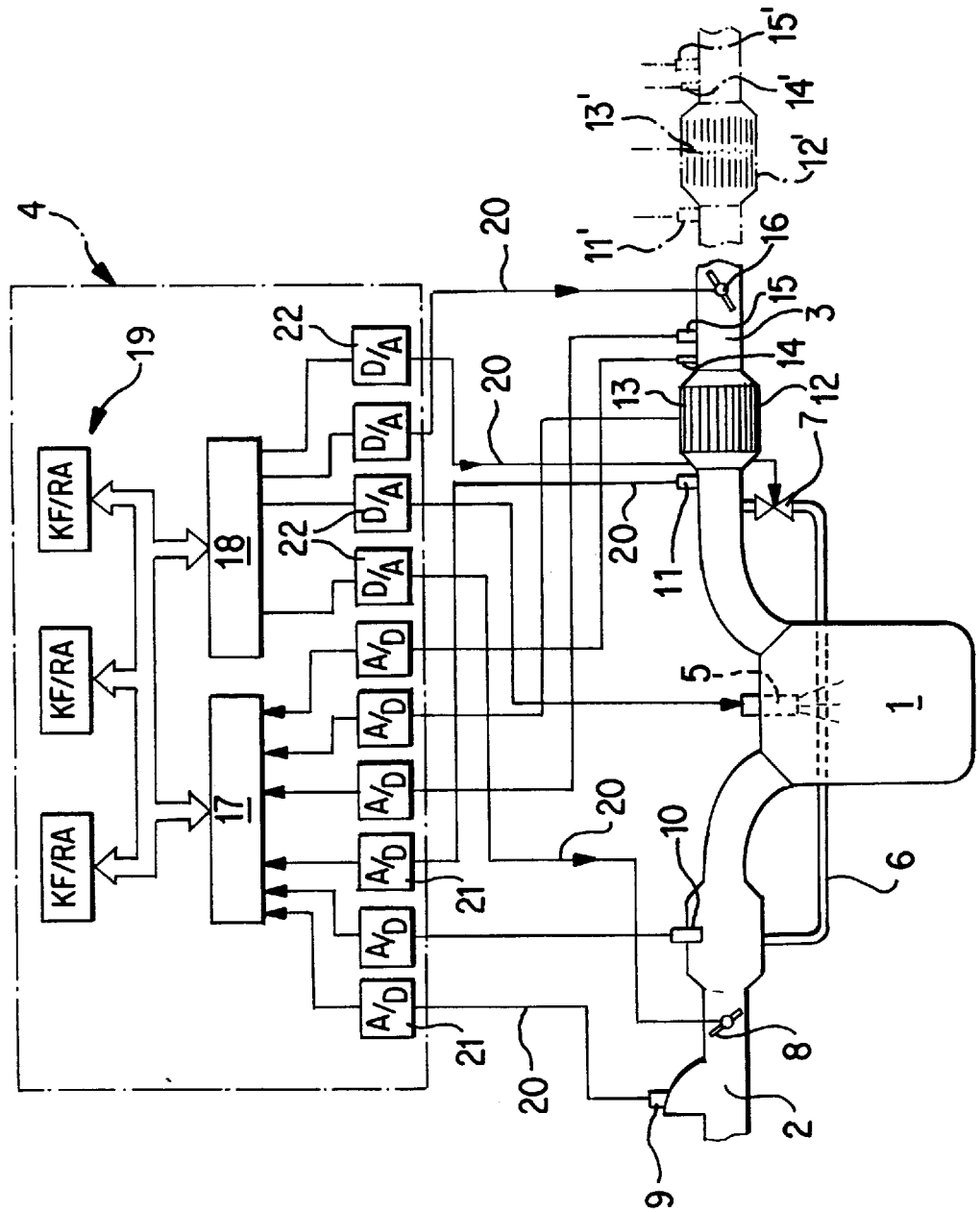
FIG. 1 is a schematic diagram of a diesel engine with exhaust feedback and an engine control as well as associated lines that connect individual assemblies such as the injection system, $NO_x$ sensor, storage catalyst, throttle valve, and $O_2$ probe with the engine control, according to a preferred embodiment of the present invention.

FIG. 1 shows in a schematic diagram a diesel engine 1 with an intake line 2 and an exhaust line 3, as well as an engine regulator 4 connected by lines with parts described in greater detail below, measuring and regulating devices 7–16 of the diesel engine.

Diesel engine 1 includes an injection system 5 as well as an exhaust feedback device 6 (exhaust feedback line) in which an adjusting element 7 (exhaust return valve) is located that can be operated by a positioning drive, operated by an auxiliary force and not shown in greater detail, to actuate exhaust feedback device 6 as a function of signals from an electronic control device or from engine regulator 4.

Intake line 2 contains a throttle valve 8 as well as an air volume gauge 9 and a pressure sensor 10 while exhaust line 3 contains a lambda probe 11, a storage catalyst ($NO_x$ adsorber) 12 for storing oxides of nitrogen, a temperature sensor 13, an HC sensor 14, and an $NO_x$ sensor 15 to detect the $NO_x$ components in the exhaust stream, as well as an exhaust valve 16.

Engine regulator 4 comprises a read-in unit 17 (input side) and an output unit 18 (output side) as well as a computer unit 19 in which individual characteristic maps KF and regulating algorithms RA are stored to regulate diesel engine 1. Communication of engine regulator 4 with the components, measuring and regulating devices 7–16 of the diesel engine 1 is accomplished through lines 20 and analog/digital converters 21 on the input side and digital/analog converters 22 on the output side.

Storage catalyst 12 ($NO_x$ adsorber) is essentially a three-way catalyst with additional $NO_x$ storage components such as perovskite (e.g. $La_2CoO_3$) and, in a theoretically known fashion, comprises a carrier made of aluminum oxide on which a catalyst-noble metal dispersion is supported that consists of a combination of elements from one or more of the following groups of the periodic system: the group of alkali metals (e.g. potassium, lithium) and/or the group of alkaline earth metals (e.g. barium and strontium) and/or the rare earth metals (e.g. lanthanum) and/or the group of noble metals (e.g. platinum and palladium).

Figure 2:
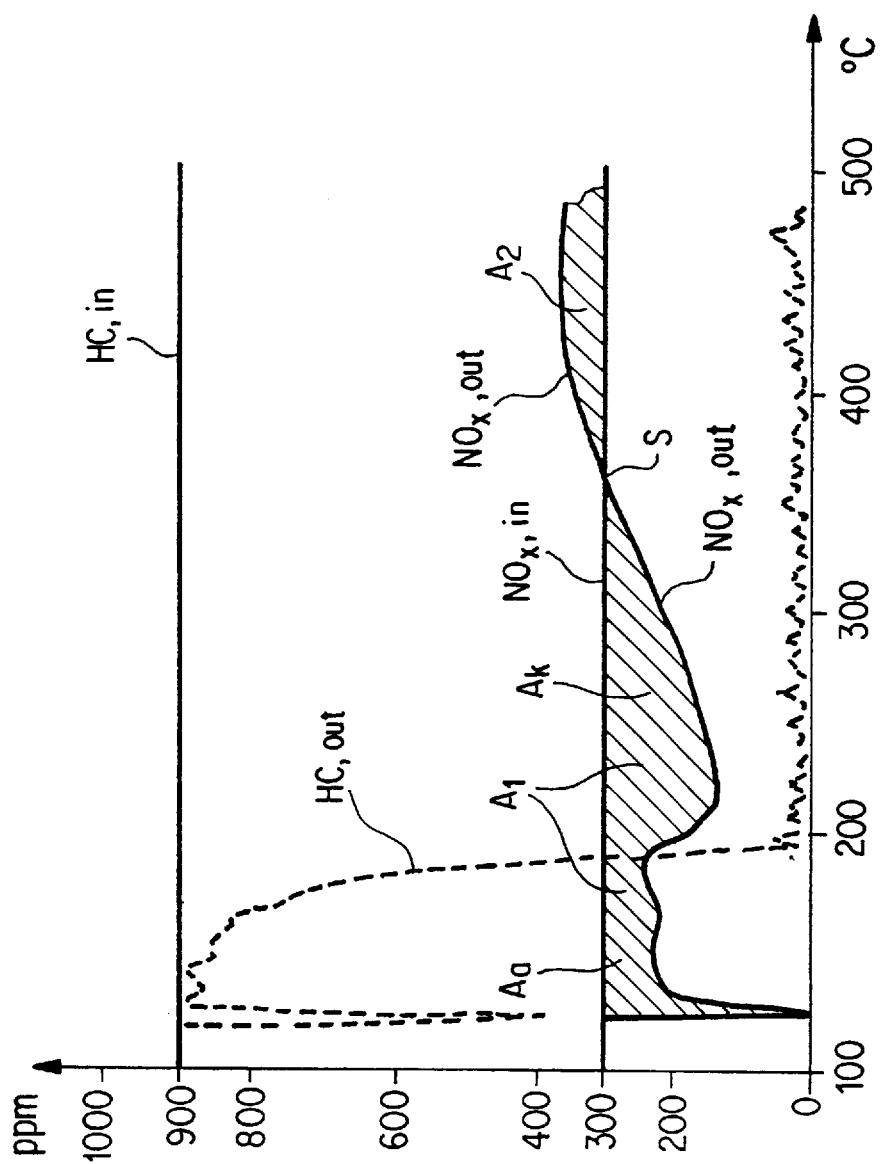
FIG. 2 shows an example of a concentration curve of the $NO_x$ and HC expelled from an $NO_x$ adsorber (storage catalyst) as a function of the reactor temperature of the $NO_x$ adsorber at a set input concentration of HC=900 ppm and $NO_x$=300 ppm under lean conditions.

FIG. 2 shows a concentration curve of oxides of nitrogen ($NO_x$) and hydrocarbons (HC) at the output of storage catalyst 12 as a function of its reactor temperature, with the input concentrations of the oxides of nitrogen $NO_x$ and the hydrocarbons HC being 300 ppm and 900 ppm, respectively, under lean conditions when they enter the adsorber, as shown by the lines $NO_{x,in}$ and $HC_{,in}$ in FIG. 2. The reactor temperature is plotted on the abscissa in °C. (degrees Celsius) and the concentrations in ppm (parts per million) for $NO_x$ and HC in the exhaust after passing through storage catalyst 12 are plotted on the ordinate. The solid line $NO_{x,out}$ shows the output concentration curve of $NO_x$ from the adsorber while the dashed line $HC_{,out}$ shows the output concentration curve of HC from the adsorber as a function of reactor temperature.

In a temperature range from 100° to 200° C. it is primarily adsorption of $NO_x$ that takes place, but reduction of $NO_x$ is also beginning in storage catalyst 12. Above a temperature of about 200° C., catalytic conversion of $NO_x$ into $N_2$ and $O_2$ takes place as a result of oxidation of HC and simultaneous reduction of $NO_x$.

The gently rising $NO_{x,out}$ output concentration curve of $NO_x$ on the outlet side of storage catalyst 12 at higher temperatures (T>250° C.) indicates that direct oxidation of hydrocarbons at higher temperatures in exhaust containing oxygen is favored and the reaction rate of $NO_x$ reduction decreases to a greater extent. It is clear from the $HC_{,out}$ output concentration curve that above a reactor temperature of 250° C. nearly all of the HC is consumed. At higher reactor temperatures T (T greater than 400° C.), thermodesorption of previously-stored $NO_x$ takes place in storage catalyst 12. However, it is clearly evident that there is a significant reduction of $NO_x$ in the exhaust over the entire Diesel-relevant exhaust temperature range.

The two areas $A_1$ and $A_2$ can be compared for this purpose that extend between the $NO_x$ output concentration curve $NO_{x,out}$ and the input concentration curve $NO_{x,in}$ of $NO_x$ flowing into storage catalyst 12 (300 ppm) and represent the $NO_x$ content of the exhaust flowing out of the adsorber. Area $A_1$ runs along the abscissa from approximately 100° C. up to intersection S of the $NO_x$ output concentration curve $NO_{x,out}$ with the $NO_{x,in}$ input concentration line at 300 ppm (intersection S is located at approximately 350° C.). Area $A_2$ runs along the abscissa from the intersection S up to approximately 500° C. It is clearly evident that area $A_1$ located below the $NO_{x,in}$ input concentration line is larger than area $A_2$ located above the $NO_{x,in}$ input concentration line. Thus, viewed over the entire temperature range, significantly more $NO_x$ is converted into harmless components by adsorption and catalytic conversion than the amount of $NO_x$ that is released by temperature desorption.

Area $A_1$ can also be subdivided into areas $A_a$ and $A_k$, with area $A_a$ representing the $NO_x$ that is adsorbed primarily in storage catalyst 12 and $A_k$ representing the $NO_x$ that is catalytically converted in storage catalyst 12. The boundary between area $A_a$ and area $A_k$ is the $HC_{,out}$ output concentration curve which passes through area $A_1$ just below 200° C. in FIG. 2.

Engine regulator 4 permits rich/lean control of diesel engine 1 as a function of operating parameters such as load, rpm, and injection volume. By means of $NO_x$ sensor 15, when a $NO_x$-storage-threshold value is reached that varies on the curve as a function of rpm and load, a switch is made from operating diesel engine 1 with an air-fuel ratio (lambda value) larger than 1 ("normal operation") to operating with a lambda value of less than 1. The predetermined $NO_x$ threshold value may be, for example, within the range of 10 ppm to 300 ppm.

During operation with lambda less than 1, $NO_x$ storage catalyst 12 is regenerated, in other words the stored $NO_x$ is reduced by HC, with regeneration operation being initiated and supported by exhaust feedback, thus increasing the exhaust back pressure, by an additional quantity of fuel added in the vicinity of the combustion end, or by throttling the intake air. Thus, for optimum regeneration of $NO_x$ storage catalyst 12, in a temperature window of 200° to 250° C., additional fuel is injected, especially upstream of $NO_x$ storage catalyst 12.

With engine operation at lambda larger than 1, adsorption of $NO_x$ takes place for as long as the $NO_x$ adsorber is not saturated. A diesel engine produces carbon black (soot) during operation, as part of the exhaust, which may be deposited on the storage catalyst. The carbon black (soot) emitted by the engine or precipitated on the storage catalyst may be used as a reducing agent for the $NO_x$.

The initiation of regeneration operation by changing the exhaust composition is performed by the engine regulating measures described below: first the engine is operated between the storage and regeneration operating modes of the storage catalyst. The $NO_x$ volume flow is then detected by means of a characteristic map (rpm, load, injection volume). An $NO_x$ sensor is located downstream from the storage catalyst, said sensor switching automatically from regeneration operation as a function of rpm, load, and injection volume when an $NO_x$ threshold value is reached, meaning that the exhaust composition is altered accordingly. This change in exhaust composition takes place as a result of the following engine regulation measures as a function of the operating parameters of the engine:

electronically regulated exhaust feedback,
    intake air throttling,
    additional injection of diesel fuel either by late injection directly into the engine (for example in a common-rail injection system) or by post-injection into the exhaust pipe,
    optimization of exhaust composition by measuring carbon black (soot) particles,
    controlling the regenerator temperature of storage catalyst 12 ($NO_x$ adsorber) by means of exhaust valve 16 or a burner located upstream of adsorber 12 but not shown.

The rich/lean regulation of diesel engine 1 takes place as a function of the residual oxygen content in the exhaust. The latter is measured by an $O_2$ probe (a lambda probe for example) located in the exhaust system or determined by a computer on the basis of the injected fuel volume and the air volume drawn in.

The goal of the measures related to the engine described above is firstly to supply sufficient reducing agent, in the form of hydrocarbons for $NO_x$ reduction for example, and secondly to create a reducing atmosphere in the exhaust and/or in the area of the catalyst in a short space of time, said atmosphere then supporting the regeneration process.

In another embodiment of the invention, to improve $NO_x$ reduction in a temperature range from 200° to 300° C. for $NO_x$ storage catalyst 12, HC is additionally provided as a reducing agent. This results in avoidance of the thermodesorption of $NO_x$ described above and hence leads to a further reduction of $NO_x$ emissions.

Studies have shown that undesired nitrous oxide ($N_2O$) is formed in $NO_x$ storage catalysts in an oxidizing atmosphere. According to the present invention, the production of nitrous oxide can be prevented by regulating the exhaust composition through deliberate HC addition in such fashion that the exhaust has a reducing effect in $NO_x$ storage catalyst 12. In order to prevent $N_2O$ formation effectively it is also necessary for the reactor temperature of $NO_x$ storage catalyst 12 to be higher, approximately 350° C. To reach this reactor temperature, in addition to the engine-related measures described above, additional internal engine measures are proposed, namely "retarding" the beginning of injection, which results in an increase in exhaust temperature. By means of exhaust temperatures raised in this fashion, the required heating of $NO_x$ storage catalyst 12 can be accomplished in simple fashion.

In another embodiment of the invention, in addition to $NO_x$ sensor 15, HC sensor 14 is used to control the regeneration of $NO_x$ storage catalyst 12. HC sensor 14 can detect the completeness of regeneration during operation when lambda is less than 1, since the HC emissions during "rich operation" rise sharply as soon as regeneration of $NO_x$ storage catalyst 12 ceases.

As indicated by the dot-dashed lines in FIG. 1, in another embodiment of the invention, a structured catalyst system can be provided with an $NO_x$ storage catalyst near the engine and an underfloor catalyst with or without an $NO_x$ storage function, labeled 12' in FIG. 1. Analogously to lambda probe 11, temperature sensor 13, HC sensor 14, and $NO_x$ sensor 15, a lambda probe 11', a temperature sensor 13', an HC sensor 14', and an $NO_x$ sensor 15' can be provided in the vicinity of underfloor catalyst 12'. With an $NO_x$ and exhaust temperature-guided HC metering strategy (for example as described above, by injecting fuel downstream by means of common-rail), the temperature window of both catalysts can be adjusted and so adsorption, desorption, and reduction (conversion) of $NO_x$ are optimally guided and influenced. HC is injected in the effective temperature window of the $NO_x$ storage catalyst, depending on the amount of $NO_x$ present. At the beginning of the temperature window that is effective for desorption and reduction, HC post-injection is utilized deliberately to increase the temperature and change the exhaust composition. Both of these favor the reactions that are required for $NO_x$ reduction.

In addition, $N_2O$ formation can be drastically reduced by an optimum post-injection strategy for HC.

The provision of the two catalysts, for example one catalyst near the engine and another catalyst remote from the engine ensures that the two catalysts operate in different temperature ranges and are so tuned that the functions of desorption (catalyst near the engine) and simultaneous reduction (catalyst remote from the engine) have an additional effect. In other words, reduction of $NO_x$ in underfloor catalyst 12' takes place simultaneously with desorption of $NO_x$ in catalyst 12 near the engine. For example, a storage catalyst and a $DeNO_x$ catalyst with different operating ranges may be provided in the exhaust line, the operating ranges of the two catalysts being tuned to one another with respect to temperature such that the storage catalyst is desorbing the $NO_x$ while the $DeNO_x$ catalyst is reducing the $NO_x$. To control the structured catalyst system, the $NO_x$ volume can either be determined from the engine characteristic map or can be measured using an $NO_x$ sensor.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for operating a diesel engine including an intake air line and an exhaust line carrying exhaust, an exhaust feedback device communicating said exhaust line with said intake air line, said exhaust feedback device being adjustable as a function of signals from an electronic control device, an engine regulating device controlling an air-fuel ratio of the diesel engine as a function of operating parameters of the diesel engine, a storage catalyst being provided in said exhaust line, said catalyst being capable of adsorbing, desorbing, and reducing $NO_x$, a sensor being provided in said exhaust line downstream from said storage catalyst for detecting the $NO_x$ concentration in the exhaust, said method comprising the step of:

switching operation of the diesel engine from an operation with the air-fuel ratio greater than one to an operation with the air-fuel ratio less than one when said sensor senses a predetermined $NO_x$ threshold value, which value varies in terms of a characteristic map of the diesel engine as a function of rpm and load.

2. A method according to claim 1, further comprising the step of adjusting the exhaust feedback device with an adjusting element that actuates the exhaust feedback device by a positioning drive, actuated by an auxiliary force.

3. A method according to claim 1, further comprising the step of regenerating the storage catalyst and reducing the $NO_x$ during said operation with an air-fuel ratio less than one.

4. A method according to claim 1, further comprising the step of regenerating the storage catalyst, said regenerating step being initiated and supported by at least one of a feedback of the exhaust from said exhaust line to said intake air line by said exhaust feedback device, an increase in exhaust back pressure, an addition of fuel volume in the vicinity of the combustion end, and a throttling of the intake air.

5. A method according to claim 1, further comprising the steps of:

regenerating the storage catalyst; and blocking the exhaust in said exhaust line by means of an exhaust valve provided in the exhaust line, during the regenerating step, in order to generate increased exhaust back pressure.

6. A method according to claim 1, further comprising the steps of:

regenerating the storage catalyst; and increasing the exhaust temperature by means of a burner arranged proximate the storage catalyst, during said regenerating step.

7. A method according to claim 1, wherein carbon black emitted by the engine or precipitated on the storage catalyst is used as a reducing agent.

8. A method according to claim 1, wherein hydrocarbons are provided as a reducing agent by late injection of fuel into the engine.

9. A method according to claim 1, wherein the air-fuel ratio of the diesel engine is regulated as a function of a residual oxygen content in the exhaust.

10. A method according to claim 1, further comprising the step of adding hydrocarbons to the exhaust as a reducing agent.

11. A method according to claim 10, wherein said step of adding hydrocarbons is performed when the temperature of the storage catalyst is in the range of 200° to 300° C.

12. A method according to claim 1, further comprising the step of adding hydrocarbons to the exhaust in order to prevent formation of nitrous oxide in the storage catalyst and to produce an atmosphere with a reducing action in an area of the storage catalyst.

13. A method according to claim 1, wherein a storage catalyst and a $DeNO_x$ catalyst with different operating ranges are provided in the exhaust line, the operating ranges of the two catalysts being tuned to one another with respect to temperature such that the storage catalyst is desorbing $NO_x$ while the $DeNO_x$ catalyst is reducing $NO_x$.

14. A method according to claim 3, further comprising the step of controlling the regenerating step with an HC sensor.

15. An apparatus for operating a diesel engine comprising:

an intake air line and an exhaust line carrying exhaust;

an exhaust feedback device communicating said exhaust line with said intake air line, said exhaust feedback device being adjustable as a function of signals from an electronic control device;

an engine regulating device controlling an air-fuel ratio of the diesel engine as a function of operating parameters of the diesel engine;

a storage catalyst arranged in said exhaust line, said catalyst being capable of adsorbing, desorbing, and reducing $NO_x$; and a sensor arranged in said exhaust line downstream from said storage catalyst for detecting the $NO_x$ concentration in the exhaust, said sensor switching operation of the diesel engine from an operation with the air-fuel ratio greater than one to an operation with the air-fuel ratio less than one when said sensor senses a predetermined $NO_x$ threshold value, which value varies in terms of a characteristic map of the diesel engine as a function of rpm and load, said storage catalyst being regenerated when said air-fuel ratio is less than one.

16. A method according to claim 15, further comprising an adjusting element which is arranged and configured to actuate the exhaust feedback device by way of a positioning drive, actuated by an auxiliary force.

17. An apparatus according to claim 15, further comprising an exhaust valve arranged in said exhaust line, said exhaust valve being configured and controlled to block the exhaust in said exhaust line when said storage catalyst is being regenerated, in order to generate increased exhaust back pressure.

18. An apparatus according to claim 15, further comprising a burner arranged proximate the storage catalyst, said burner being controlled to increase the exhaust temperature when said storage catalyst is being regenerated.

19. An apparatus according to claim 15, wherein said engine regulating device controls the air-fuel ratio of the diesel engine as a function of a residual oxygen content in the exhaust.

20. An apparatus according to claim 15, further comprising a $DeNO_x$ catalyst arranged downstream of the storage catalyst in the exhaust line, said $DeNO_x$ catalyst having a different operating range than the storage catalyst, the operating ranges of the two catalysts being tuned to one another with respect to temperature such that the storage catalyst is desorbing $NO_x$ while the $DeNO_x$ catalyst is reducing $NO_x$.

21. An apparatus according to claim 15, further comprising an HC sensor arranged in said exhaust line, the HC sensor controlling the regeneration of the storage catalyst.

* * * * *